Aug. 22, 1933.                J. D. TUCKER                1,923,177
                                REAMER
                           Filed Dec. 15, 1930
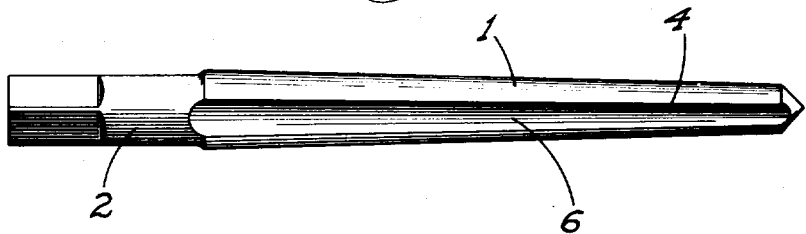
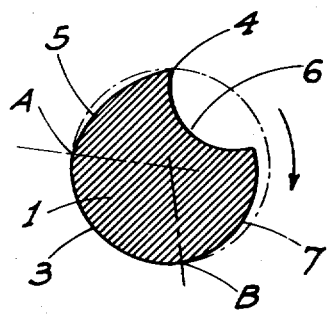
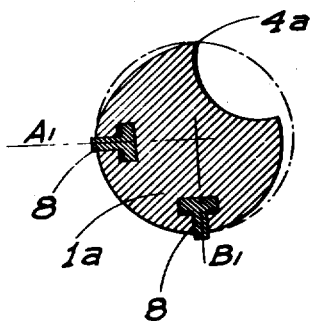
INVENTOR
J. D. Tucker
BY
ATTORNEY Patented Aug. 22, 1933

1,923,177

UNITED STATES PATENT OFFICE

1,923,177
REAMER

Jesse D. Tucker, North Sacramento, Calif., assignor to Tucker-Gilmore Mfg. Company, North Sacramento, Calif., a Corporation of California Application December 15, 1930
Serial No. 502,301

2 Claims. (Cl. 77—67)

This invention relates to reamers, my main objects being to provide a reamer which will be stronger than the multiple flute reamer now commonly used; and which will not tend to be chipped or broken; one which provides for easy escape of the metal particles cut or reamed out; and one which is formed so that its leading or cutting edge engages the metal of the hole at a constant and natural cutting angle, while at the same time the reamer will be always maintained properly centered in the hole. The reamer may be made of any size and of either straight or tapered form, and will perform with equal efficiency in any size or form.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a side elevation of a taper reamer constructed according to my invention.

Fig. 2 is an enlarged typical cross section of the same.

Fig. 3 is a typical cross section of a straight reamer constructed according to my invention, and provided with adjustable gibs whereby the working size of the reamer may be increased somewhat.

Referring now more particularly to the characters of reference on the drawing, and particularly at present to Figs. 1 and 2, the body 1 of the reamer is of taper form and is integral as usual with an end shank 2 arranged for connection to a chuck or other turning device. The body for its full length is circular and concentric with its axis only for a circumferential distance approximating or slightly greater than 90 degrees, as shown at 3; the limits of the concentric portion being denoted at A and B. Around the body an arcuate extent a few degrees less than 90 degrees from the termination A of the concentric portion, is the cutting or leading edge 4 of the reamer, which edge of course extends from end to end of the body. This edge is in the same circle as the portion 3; the periphery of the body between said edge and the termination A being relieved as shown at 5, so that the cutting edge of the reamer is disposed in chisel-like relation to the peripheral metal of the hole being removed. The body head of the cutting edge is provided with a deep recess 6 which extends lengthwise of the body the full length of the cutting edge and which extends around the body from said edge toward the termination B; the periphery of the body from the end of the recess opposite the cutting edge of the termination B being preferably disposed in relieved or eccentric relation to the axis of the reamer, as shown at 7, so that this portion of the body does not touch the metal about the hole. The circumferential or arcuate distance between the cutting edge and the termination B on the side of the reamer is somewhat less than 180 degrees.

It will therefore be seen that by reason of this construction the reamer has what may be considered a three-point engagement or contact with the hole, namely, the cutting edge and the terminations or points A and B; the portion 3 throughout its extent of course following the contour of and actually being in firm engagement with the metal about the hole. The resistance to the cutting edge offered to the rotation of the reamer and tending to deflect the reamer laterally may be considered as being taken up or counteracted at the point A, which in effect forms a rest; while firm engagement of the reamer with the metal of the hole at the point B prevents possible deflection of the cutting edge transversely and away from the periphery of the hole. The three main bearings points 4, A, and B, extend about an arc preferably greater than 180 degrees, so that there is no tendency for the reamer to ever lose its centralized position in the hole. As a result of the above features therefore a clean cut is made, the chips have easy exit through the relatively large recess, and the reamer is always centralized in the hole, so that the latter is reamed to a true circle which is always concentric with the original hole. Also there is no tendency for the reamer to chatter when in operation.

The same results may be obtained in a straight reamer, the cross section of the body 1a of which is shown in Fig. 3. With such a reamer I may use the radially adjustable gibs or flutes 8 which are sometimes employed in standard reamers. These gibs are disposed in substantial alinement with radial lines A—1 and B—1 whose arcuate spacing relative to each other and to the cutting edge 4a corresponds to the positions of the points A and B in the first described type. These gibs therefore when projected from the body form two of the bearings or resistance points and function the same as the bearing points A and B.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A reamer comprising a body provided with a longitudinal recess in one side to form spaced cutting and following edges with the periphery of the body, the cutting edge and an arcuate portion of the body greater than 90° in extent and having its inception less than 90° back of the cutting edge lying in a common circle concentric with the axis of rotation of the reamer and the periphery of the body being depressed relative to said circle from the cutting edge to the adjacent end of said arcuate concentric portion, and from the opposite end of said portion to the following edge.

2. A reamer comprising a body provided with a longitudinal recess in one side to form spaced cutting and following edges with the periphery of the body, there being a point on the periphery of the body an arcuate distance not less than 180° back of the cutting edge which lies in a common circle with the cutting edge and concentric with the axis of the reamer, there being also another point on the periphery of the body also lying in said circle and disposed between said first point and the cutting edge an arcuate distance less than 90° from the latter; the periphery of the body being depressed relative to said circle between the last named point and the cutting edge and between said first named point and the following edge.

JESSE D. TUCKER.